Nov. 8, 1955     I. FLEETWOOD     2,722,768
CASTING BOBBER
Filed April 7, 1952
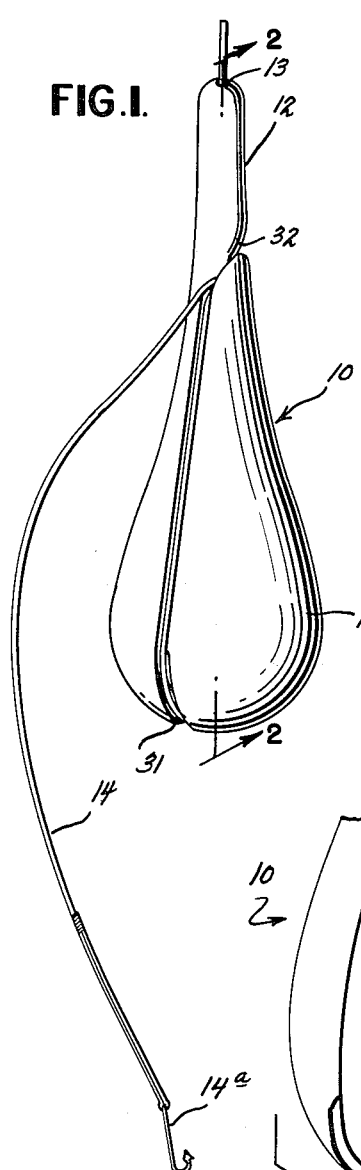
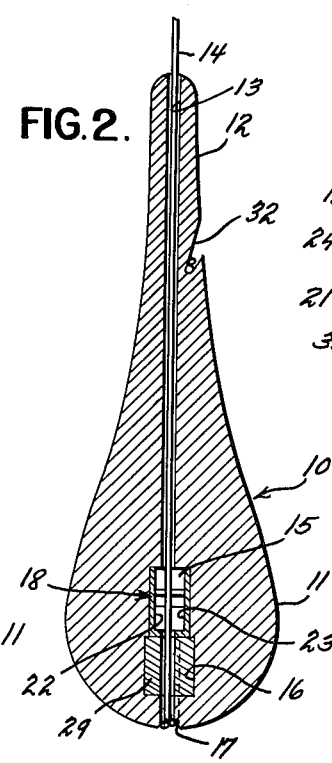
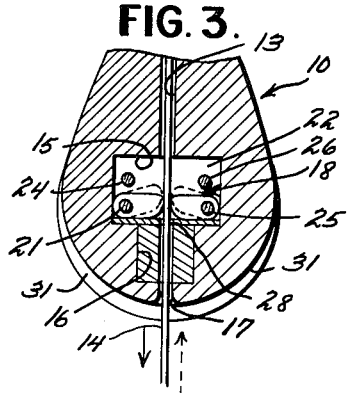
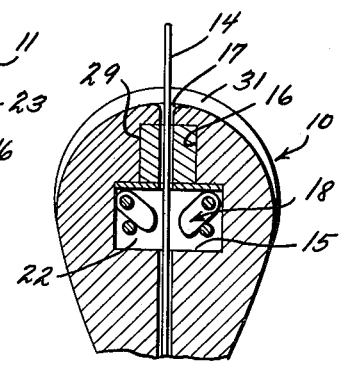
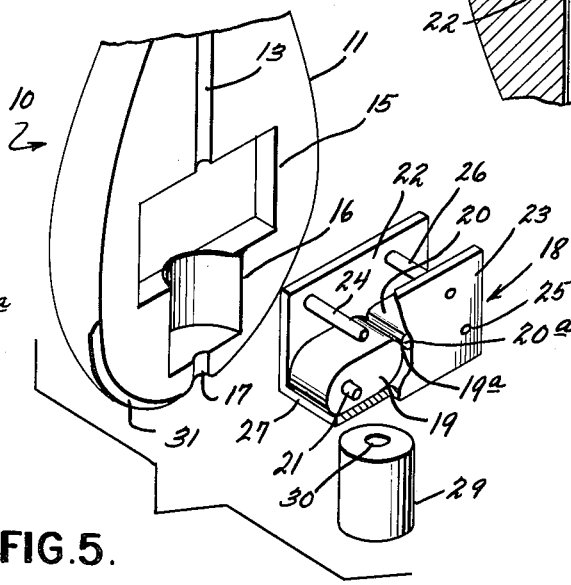
INVENTOR
IRA FLEETWOOD
BY *Thomas F. Healy*
ATTORNEY

Patent Text Excerpt

2,722,768

CASTING BOBBER

Ira Fleetwood, Rushville, Ind.

Application April 7, 1952, Serial No. 280,997

1 Claim. (Cl. 43—44.91)

The present invention relates to a casting bobber and more particularly to a casting bobber for live bait such as minnows.

An object of the present invention is to provide a casting bobber constructed and designed so as to permit the fishing line, carrying the hook and bait, to easily unwind therefrom when the bobber hits the water following the casting operation.

Another object is to provide a casting bobber with means to adjust the position of the bobber on the fishing line with relation to the hook before and after the casting operation.

Still another object of the present invention is to provide a casting bobber for live bait comprising, a floatable body adapted to receive a fishing line therethrough, fishing line gripping and releasing means disposed within said floatable body and adapted to release the line in certain positions thereof, and said body being externally recessed at spaced apart points to receive the fishing line preparatory to the casting operation.

Yet another object of the present invention is to provide in a casting bobber adapted to receive a fishing line therethrough, a line gripping and releasing means disposed within the bobber comprising, two rocker arms each adapted to engage the fishing line to prevent line movement through the bobber in one direction while permitting line movement in the opposite direction during the same position of the bobber, said line being movable through the bobber in both directions during the inverted position of the bobber from the position aforesaid, and a support for said rocker arms to permit swingable movement thereof.

Other and further objects and advantages of the present invention will be apparent from the following description thereof and from the claims appended thereto.

In the drawing, wherein like numerals refer to like or corresponding parts throughout the several views;

Figure 1 is a perspective view of the casting bobber embodying the features of the present invention and showing the fishing line positioned in wrapped-around association with said bobber;

Figure 2 is a sectional view taken along the line 2—2 of Figure 1, in the direction of the arrows;

Figure 3 is a fragmentary sectional view of the lower portion of the bobber illustrating the position of the rocker arms with relation to the fishing line passing through the bobber;

Figure 4 is an inverted sectional view of the fragmentary section of the bobber as shown in Figure 3; and Figure 5 is an exploded view of a fragmentary portion of the bobber illustrating the rocker arm assembly and weighted member as removed from the bobber.

Referring now to the drawing, the numeral 10 generally represents a casting bobber having a rounded portion 11 at one end thereof which merges into an elongated or tapering portion 12 at the opposite end thereof. The bobber 10 may be of any desired shape adapted to carry out the features of the invention and constructed of any desired floatable material, for example plastic, wood, or the like.

As more clearly shown in Figure 2 of the drawing, the bobber or float 10 is provided with an aperture 13 extending substantially lengthwise through the float 10, which aperture 13 is adapted to receive a fishing line 14, which extends therethrough. The aperture 13 communicates with an internally recessed portion 15 within the body of the float or bobber 10. The recessed portion 15 may be of any desired shape, but is shown as being substantially rectangular. The recessed portion 15 communicates with a substantially cylindrical recessed portion 16 which in turn communicates with an aperture 17 which is more or less a continuation of the aperture 13 which passes through the major portion of the body of the bobber 10. The recessed portion 15 is a supporting means for the rocker arm assembly 18 while the recessed portion 16 is a supporting means for weight member 29, as described later.

Referring now to Figure 5 of the drawing, the numeral 18 generally represents a rocker arm assembly so constructed and designed as to fit snugly into the rectangular recess 15 within the body 10 of the bobber. The rocker arm assembly generally comprises two rocker arms 19 and 20 each provided with rounded portions 19a and 20a, respectively, which portions 19a and 20a abut each other when the rocker arms 19 and 20 are horizontally disposed and bite line 14 to prevent movement thereof in the direction of the full arrow, Figure 3. Rocker arm 19 is provided with a pivot pin 21 which is secured on opposite sides thereof in the side walls 22 and 23 of a supporting bracket which is substantially U-shaped. Positioned above rocker arm 19 and secured to the side walls 22 and 23 is a stop rod or bar 24 which limits the swinging movement of the rocker arm when the rocker arm assembly is held in inverted position as shown in Figure 4 of the drawing. Likewise, rocker arm 20 is provided with a pivot pin 25 on opposite sides thereof, which pivot pin 25 is secured in the side walls 22 and 23 of the rocker arm support so as to permit the rocker arm 20 to swing or pivot. Above the rocker arm 20 and secured to the side walls 22 and 23, is a stop bar 26 which prevents the rocker arm 20 from swinging beyond a certain desired position when the rocker arm assembly is held in inverted position as shown in Figure 4 of the drawing, so that rocker arm 20, together with arm 19, will fall back into position when the bobber is held in the position shown in Figure 3 of the drawing.

The side walls 22 and 23 extend upwardly from a base 27, which is centrally apertured at 28 to receive the fishing line 14 therethrough. Side walls 22 and 23, together with base 27 form substantially a U-shaped bracket.

Positioned beneath the rocker arm assembly 18 is a weight member 29 which is of cylindrical shape and adapted to snugly engage in the cylindrical recess 16 within the body of the bobber 10. The cylindrical weight element 29 is provided with an aperture 30 which extends lengthwise therethrough and is adapted to receive the fishing line 14.

The rounded portion 11 of the bobber 10 is provided across the bottom thereof with a recessed portion or notch 31 which extends upwardly along the sides of the rounded portion 11 of the body in the general direction of the longitudinal axis of the float. The notch 31 is of such a depth as to receive a plurality of windings of the fishing line 14.

The tapered portion 12 of the bobber 10 is likewise provided with a recessed portion or notch 32 which extends inwardly at an angle relative to the longitudinal axis of the body of the bobber, and is positioned with respect to the recess 31 so as to permit the fishing line 14 to be wound lengthwise across a portion of the outer surface of the bobber 10, with the fishing line 14 lying in the recesses 31 and 32. The external recess 32 will appear on the surface of the tapered portion 12 of the bobber 10 at a portion determined by rotating the recessed portion 31 through substantially ninety degrees around the longitudinal axis of the bobber 10. The notches 31 and 32 are adapted to cooperate so as to permit the easy unwinding of the line 14 from the bobber 10 when the bobber 10 hits the water after a casting operation.

In operation, the fishing line 14 is disposed through aperture 13 in the bobber 10 and between the rocker arms 19 and 20 of the rocker arm assembly, while holding the float 10 in its inverted position as shown in Figure 4 so that the rocker arms 19 and 20 fall back against stop bars 24 and 26, respectively. The line 14 is then disposed through aperture 28 which is centrally positioned in the base 27 of the rocker arm assembly and then through the aperture 30 of the cylindrical weight member 29, and then through the opening 17 where it can then be suitably attached to a fishing hook 14a. While still holding the bobber 10 in its inverted position, the fishing hook 14a can be adjusted as to its relative position with reference to the bobber 10. After the bobber 10 is positioned on the fishing line 14 at the desired place above the fishing hook 14a, the fishing bobber 10 is then positioned as shown in Figure 1 of the drawing which causes the rocker arms 19 and 20 to bite the line 14, as more clearly is shown in Figure 3 of the drawing.

The fishing line 14 is attached at its other end to a fishing reel (not shown) which cooperates with a suitable casting rod (not shown). As shown in Figure 3, if it is desired to shorten the distance between the hook 14a and the float 10, it is only necessary to make a sharp jerk with the casting rod, or to wind the reel with a quick movement, as the rocker arms 19 and 20 are adapted to swing slightly to permit the line 14 to be reeled in. Because of the biting action of the rocker arms 19 and 20 on the line 14, said line 14 is immovable against pressure applied in the direction of the hook 14a so that there will be no slipping of line 14 when a fish takes the bait on the hook 14a. After the bobber 10 is properly positioned on the line 14 with reference to the hook 14a a live bait such as a minnow or the like is put on the hook 14a. Fishing line 14 is then wound around the body 10 lying in recesses 31 and 32 with the minnow resting against the surface of the bobber 10.

After the casting operation, when the bobber 10 hits the water, the line 14 automatically unwraps from the bobber 10 because of the relative position of the notches 31 and 32 on the bobber, with the assistance of the live minnow on the hook 14a. The bobber 10 rests upon the surface of the water with the weighted end downwardly so as to permit the minnow to swim at the desired distance from the float. If desirable, the distance between the minnow and the float can be lessened by merely winding the fishing line 14 on the reel. The rocker arms 19 and 20 will bite line 14 to prevent slippage when a fish hits the baited hook.

Generally speaking, it is the main concept of the present invention to provide a casting bobber with suitable means to adjust the position of the bobber on the fishing line before and after the casting operation, whereby one can cast live bait, such as minnows, without injury or damage to the live bait, to permit the live bait to perform naturally in the water after the casting operation.

More specifically, the invention embraces a casting bobber for live bait comprising, a floatable body being rounded at one end portion and tapering towards the opposite end to provide a tapered end portion; said body having an aperture extending lengthwise therethrough; said body being internally recessed at the rounded end portion thereof; a rocker arm assembly disposed in a portion of said internal recess; said rocker arm assembly including a base provided with a centrally or substantially centrally disposed aperture, two side walls extending from said base, two rocker arms pivotally secured to said side walls, and a stop bar for each rocker arm, each stop bar being secured to the said walls; a weight member provided with an aperture therethrough and being disposed in the remaining portion of said internal recess, said body being externally recessed at the weighted end thereof with said recess extending across the end and lengthwise partially up the sides of said rounded end portion substantially in the direction of the longitudinal axis of said body, and said tapered portion of said body being externally recessed on the surface thereof which is exposed when rotating the body around its long longitudinal axis so that the recess on the weighted end thereof is rotated through substantially ninety degrees, and with said last mentioned recess extending inwardly at an angle relative to the longitudinal axis of said body.

The elements which comprise the rocker arm assembly are preferably made of metal of a rust proof nature, but any suitable material may be employed. The weight member 29 may be of any desired shape and is preferably made of a heavy metal such as lead, or the like. Bobber 10 should be made of floatable material and may be hollow or substantially hollow depending upon the supporting means employed for the line gripping and releasing means disposed therein.

Various modifications of the present invention will be apparent to those skilled in the art without departing from the spirit thereof, and it is therefore desired to be limited only by the scope of the appended claim.

What I claim is:

A casting bobber for live bait comprising, a floatable body being rounded at one end portion and tapering towards the opposite end to provide a tapered end portion; said body having an aperture extending lengthwise therethrough; said body being internally recessed at the rounded end portion thereof; a rocker arm assembly disposed in a portion of said internal recess; said rocker arm assembly including a base provided with a centrally disposed aperture, two side walls extending from said base, two rocker arms pivotally secured to said side walls, and a stop bar for each rocker arm, each stop bar being secured to the said walls; a weight member provided with an aperture therethrough and being substantially disposed in the remaining portion of said internal recess, said body being externally recessed at the weighted end thereof with said recess extending across the end and lengthwise partially up the sides of said rounded end portion substantially in the direction of the longitudinal axis of said body, and said tapered portion of said body being externally recessed on the surface thereof which is exposed when rotating the body around its long longitudinal axis so that the recess on the weighted end thereof is rotated through substantially ninety degrees, and with said recess on the said tapered portion of said body extending inwardly at an angle relative to the longitudinal axis of said body in the general direction of said rounded portion of said body.

References Cited in the file of this patent

UNITED STATES PATENTS

| | | |
|---|---|---|
| 99,385 | Wilbar | Feb. 1, 1870 |
| 239,542 | Pitcher | Mar. 29, 1881 |
| 740,130 | Hazard | Sept. 29, 1903 |
| 903,818 | Herth | Nov. 10, 1908 |
| 992,341 | Davis | May 16, 1911 |
| 1,134,855 | Hunsinger | Apr. 6, 1915 |
| 1,316,040 | Jamison | Sept. 16, 1919 |
| 1,520,716 | Judd | Dec. 30, 1924 |
| 1,788,542 | Page | Jan. 13, 1931 |
| 2,019,630 | Peeso | Nov. 5, 1935 |
| 2,293,294 | Heckman | Aug. 18, 1942 |
| 2,603,905 | Brzezinski | July 22, 1952 |
| 2,605,577 | Waugler | Aug. 5, 1952 |
| 2,654,177 | Cope et al. | Oct. 6, 1953 |